March 14, 1961   S. H. KRISTIANSEN   2,974,745
SOUND-DEADENING AIR-INTAKE DEVICES
Filed Jan. 14, 1954
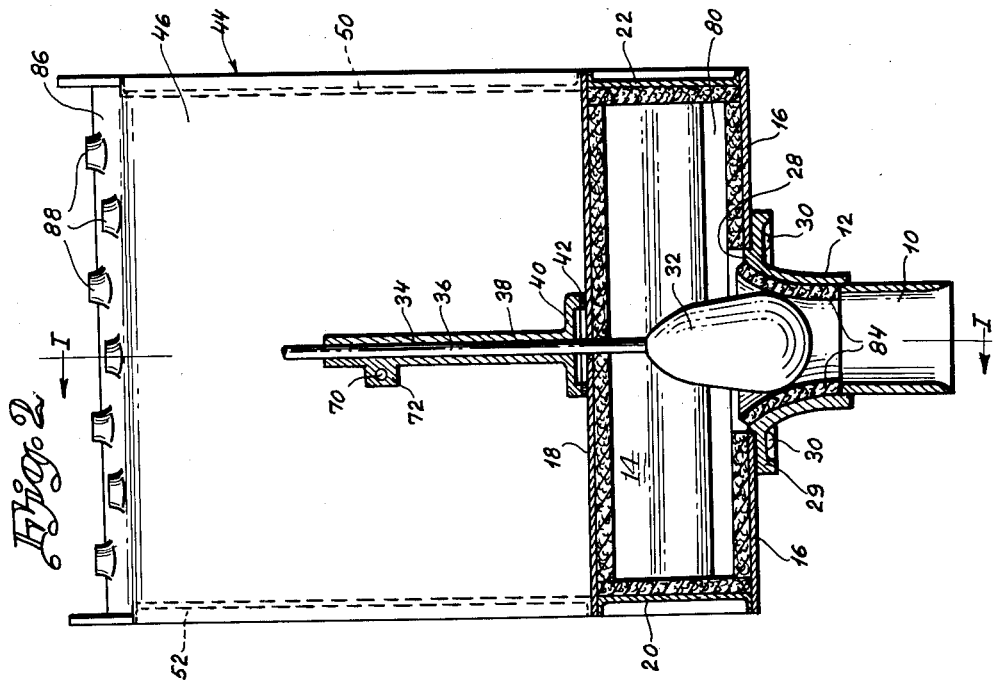
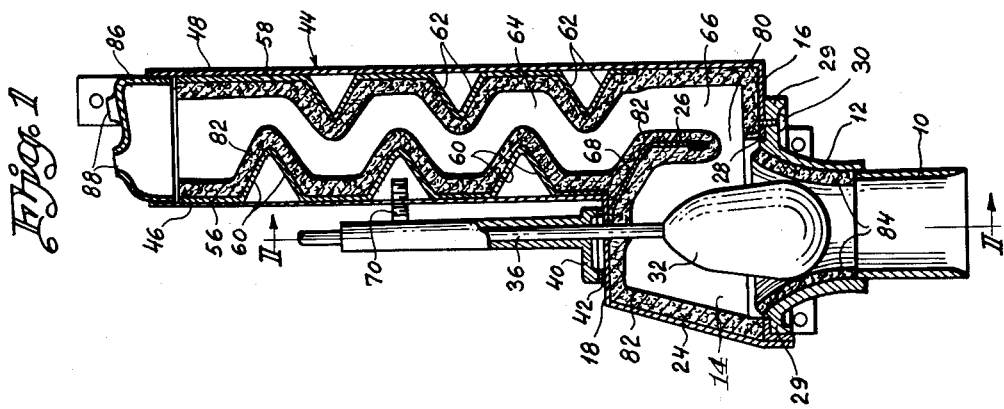
INVENTOR:
Svend Helge Kristiansen,
BY
His Agents.

United States Patent Office 2,974,745
Patented Mar. 14, 1961

2,974,745

SOUND-DEADENING AIR-INTAKE DEVICES

Svend Helge Kristiansen, Little Nestved, Denmark, assignor, by mesne assignments, to Hi-Press Air Conditioning of America, Inc., New York, N.Y., a corporation Filed Jan. 14, 1954, Ser. No. 403,996

Claims priority, application Denmark Jan. 15, 1953

7 Claims. (Cl. 181—53)

This invention relates to sound-deadening air-intake devices preferably for the supply of fresh air to air conditioning devices by which air circulation is provided by injector effect from the fresh air.

Air and especially air of high velocity produces considerable noise when discharged from an air duct to the open. A particularly loud noise is produced when the air has to pass through a valve immediately before being ejected, because while passing around the valve member the air itself produces vibrations as likewise the valve member produces other sound vibrations. Endeavors to deaden this noise immediately before ejection are usually made by leading the air stream through a sound damping duct or device or muffler in which the air flow to some extent is checked, for instance by causing it to flow in a zig-zag direction.

An object of the invention is to provide a sound-deadening air-intake device in which there is attained an almost complete deadening of sound.

Another object of the invention is to provide a sound-deadening air-intake device with a controlling valve in which an almost complete deadening of sound is obtained not withstanding the presence of the controlling valve.

A further object of the invention is to provide a sound-deadening air-intake device comprising an antechamber, having an upper wall, side walls and a bottom; an inlet member opening into said antechamber at the bottom thereof, which inlet may contain or consist of a part of a controlling valve; a sound damping duct or muffler placed at one side of said antechamber; the interior of said sound damping duct and the interior of said antechamber being interconnected through a channel having a long and narrow cross-section, the longitudinal direction of which cross-section is transverse to the axis of said inlet member, and which channel opens into said antechamber below the upper wall and through one of the side walls thereof.

In such a device the sound oscillations produced during the flow of air through the inlet member, even such sound oscillations produced during the flow of air through a possible controlling valve in said inlet member, are practically substantially deadened in the antechamber, amongst other reasons because the sound oscillations only reach the connecting channel to the sound damping duct after having been reflected several times between the walls of the antechamber. Moreover, the narrow channel causes a further damping of sound so that the normal sound damping duct is able to deaden remanant noise.

Further details of the air-intake device according to the invention will be evident from the following description of the device.

On the drawing
Fig. 1 shows a longitudinal section through the device taken on the line I—I in Fig. 2, and
Fig. 2 shows a sectional view taken on the line II—II in Fig. 1.

The air-intake device shown on the drawing is particularly destined for an air conditioning plant with air circulation produced by injector effect from the fresh air, as for instance used in various compartments on board ships, such as cabins, for heating as well as for ventilation. It is obvious that such plants need to be constructed in such a manner that they produce as little noise as possible irrespective of adjustment.

The device illustrated is provided with an inlet pipe 10, which may be connected for instance to a main duct (not shown) for fresh air. Inlet pipe 10 is further connected to a valve seat 12 shaped as a truncated cone and opening into an antechamber 14 having a bottom 16, an upper wall 18 and side walls 20, 22, 24 and 26. The valve seat 12 is inserted in an opening 28 in the bottom 16 and is provided with a flange 29 which is fastened to the bottom 16 by means of bolts 30.

Within the antechamber 14 is arranged a valve member 32 shaped as a streamlined body of revolution. The valve member 32 is attached to an adjusting rod 36 extending upwardly through the antechamber 14 and out through a hole in the upper wall 18, above which the rod 36 is guided in a passage 34 of a tubular guide 38. The lower part of guide 38 is provided with a flange 40, by which the guide is supported on the upper wall 18. Between the flange 40 and the upper wall 18 is inserted a washer 42 made of rubber or a similar material. By means of a control mechanism (not shown) the rod 36 and with it the valve member 32 may be displaced in relation to the valve seat 12 in order to adjust the valve flow area.

Owing to the concave shape of valve seat 12 the velocity of air passing through the valve, consisting of the valve seat 12 and the valve member 32, from the inlet pipe 10 will gradually be decreased whereby a reduced tendency to produce noise is obtained. Further owing to this shape of the valve seat while the valve member 32 is moved away from the valve seat 12 a slow increase takes place of the smallest flow area—especially during the initial opening of the valve—so that the risk of incurring vibration of the valve member 32 due to any sudden alteration of air velocity, as is common to valves while the flow area is small, is substantially reduced.

On the other hand although the increase of flow area is small during the initial movement of the valve member 32 from closed position to open position it increases essentially as the valve member rises.

The bottom 16 of the antechamber 14 is extended beyond the side wall 26 and serves too as bottom of a sound damping duct or device or muffler 44 further having a front wall 46, a back wall 48 and side walls 50 and 52.

On the inner side of the front wall 46 and of the back wall 48 there are attached, for instance by spot welding, plates 56 and 58 respectively which plates have folded parts 60 and 62 respectively projecting inwardly but on the two plates offset relative to each other. Hereby within the sound damping duct 44 is provided a zig-zag shaped sound damping device or duct or sound duct 64. The folded parts 60 and 62 are so shaped that each two consecutive duct parts form an angle of 60° in relation to each other. This angle may be larger than 60°, but it ought not be smaller than 45°. The effect of this is that sound waves passing through the duct will continuously strike the duct walls under a relatively large angle, and a further effect of this is that only a relatively small quantity of the sound waves are reflected.

The lower part or end 66 of duct 64 is separated from the antechamber by means of the side wall 26 of the antechamber 14 which side wall thus constitutes a partition between the lower duct part 66 and antechamber 14. The side wall 26 of the antechamber is connected to the upper wall 18 by means of a wall or a wall part 68 which forms an angle in relation to the axis of the inlet pipe 10 and the valve seat 12 and thus to some extent serves to retain the sound waves inside the antechamber 14. Further this wall or wall part 68 forms a sloping part of the sound damping duct 64.

70 designates a stud or set screw which is fastened to a side plate 72 on the guide 38 and by which this guide is secured to the front wall 56 of the sound damping duct 44.

The lower part 66 of the sound damping duct 64 and the interior of the antechamber 14 are interconnected by means of a relatively long and narrow slot 80 serving as a connecting channel between the antechamber 14 and the duct 64, which channel is relatively short in the device shown owing thereto that in this device the sound damping duct 44 is placed immediately beside the antechamber 14. This slot 80 is formed in the side wall 26 or between the lower edge thereof and the bottom 16, and thus the slot is situated some distance lower than the upper wall 18.

The slot 80, the height of which is preferably equal to or smaller than the width of the smallest cross section of the sound damping duct 64, has the same length as a cross section through the sound damping duct 64 at its lower end 66.

In this manner there is attained an even distribution of air throughout the entire width of the sound damping duct, and this will furthermore incur a substantial damping of noise. The narrow slot 80 interconnecting the antechamber 14 and the sound damping duct 64 has moreover the effect that the antechamber and the sound damping duct operate as two consecutive sound damping devices. Besides the special damping obtained in the antechamber of noise originating from air passing around the valve member 32, this arrangement provides a more powerful deadening of sound than the case would be if the antechamber and the sound damping duct together were shaped as a single large sound damping duct or muffler.

In order to increase the sound damping effect the antechamber 14 and the sound damping duct 64 are provided with a sound deadening coating 82 comprising for instance felt. For the same purpose valve seat 12 is provided with a coating 84 of a similar sound absorbing material.

From the drawing it will be apparent that after passing through slot 80 the air stream must pass along a bend of approximately 90°, which angle, however, may range between 85° and 120°, to the effect that at this point a very powerful sound absorption is obtained. The reason of this is that the few sound oscillations reflected by the wall opposite the slot 80 will mainly be returned without continuing upwardly through the duct.

The upper end of the sound damping duct 64 is closed by means of a cap 86 having a number of outlet nozzles 88 opening into the interior of an air conditioning apparatus (not shown).

Although in the above description and in the following claims there are used terms as "bottom", "upper wall" and the like terms suggesting a certain direction in which the device has to be placed, naturally it is actually insignificant whether the device is placed in one direction or another.

The invention is not restricted to the embodiment illustrated, as this may be modified in many ways within the scope of the following claims.

What I claim is:

1. A sound-damping muffler comprising an enclosure including substantially parallel side walls and inlet and outlet means disposed near opposite ends of the side walls, respectively, to permit air to flow through the enclosure from one end to the other, and a plurality of baffles of triangular cross-section disposed in spaced relation on the inside surfaces of the parallel side walls and extending across the walls transversely to the direction of air flow, the baffles being located in staggered relation on the two walls and being spaced along each wall by planar wall portions to provide an undulating path for the air composed of short path segments intersecting at angles of at least 45° and directed alternately at angles to and parallel to the side walls.

2. A sound-damping muffler according to claim 1 wherein the baffle size and spacing are selected to provide a substantially constant cross-sectional area for the undulating air path.

3. A sound-damping muffler according to claim 1 including a coating of sound absorbing material covering the inside surfaces of the side walls and the baffles.

4. A sound-deadening air-intake device for damping sound in a duct provided with an air valve comprising an enclosure forming an antechamber portion having an air inlet valve in one wall and an outlet opening in another wall, and a muffler portion communicating at one end with the antechamber portion through the outlet opening and including a pair of substantially parallel side walls extending at an angle between 85° and 120° to the direction of the outlet opening and a plurality of baffles disposed on the inside surfaces of the two parallel walls and extending across the walls transversely to the direction of air flow, the baffles on opposite walls being spaced in staggered relation to provide an undulating path for the air.

5. A sound-deadening air intake device according to claim 4 wherein each of the baffles has a triangular cross-section so that the undulating path for the air is composed of short path segments intersecting at angles of at least 45°.

6. A sound-deadening air intake device according to claim 4 wherein the baffle size and spacing are selected to provide a substantially constant cross-sectional area for the undulating path.

7. A sound-deadening air intake device according to claim 4 including a coating of sound-absorbing material covering the inside surfaces of the antechamber and the muffler.

References Cited in the file of this patent

UNITED STATES PATENTS

| | | |
|---|---|---|
| 623,935 | Wilson et al. | Apr. 25, 1899 |
| 701,496 | McKinnie | June 3, 1902 |
| 1,085,203 | Gipple | Jan. 27, 1914 |
| 1,252,373 | Gally | Jan. 1, 1918 |
| 1,340,769 | Holderle | May 18, 1920 |
| 1,511,920 | Tregillus | Oct. 14, 1924 |
| 1,514,805 | Tasso et al. | Nov. 11, 1924 |
| 1,821,688 | Bourne | Sept. 1, 1931 |
| 1,938,798 | Bourne | Dec. 12, 1933 |
| 1,953,543 | Rensink | Apr. 3, 1934 |
| 2,101,389 | Fischer | Dec. 7, 1937 |
| 2,122,447 | Zand | July 5, 1938 |
| 2,129,958 | Podolsky | Sept. 13, 1938 |
| 2,270,825 | Parkinson et al. | Jan. 20, 1942 |
| 2,510,440 | Vokes | June 6, 1950 |
| 2,644,389 | Dauphinee | July 7, 1953 |
| 2,745,509 | Argentieri | May 15, 1956 |

FOREIGN PATENTS

| | | |
|---|---|---|
| 399,543 | Germany | Aug. 5, 1924 |